May 25, 1965 J. WEIH 3,184,886
DOLL INCLUDING A COMBINED SOUND AND MOTION PRODUCING MECHANISM
Filed Feb. 26, 1962 2 Sheets-Sheet 1
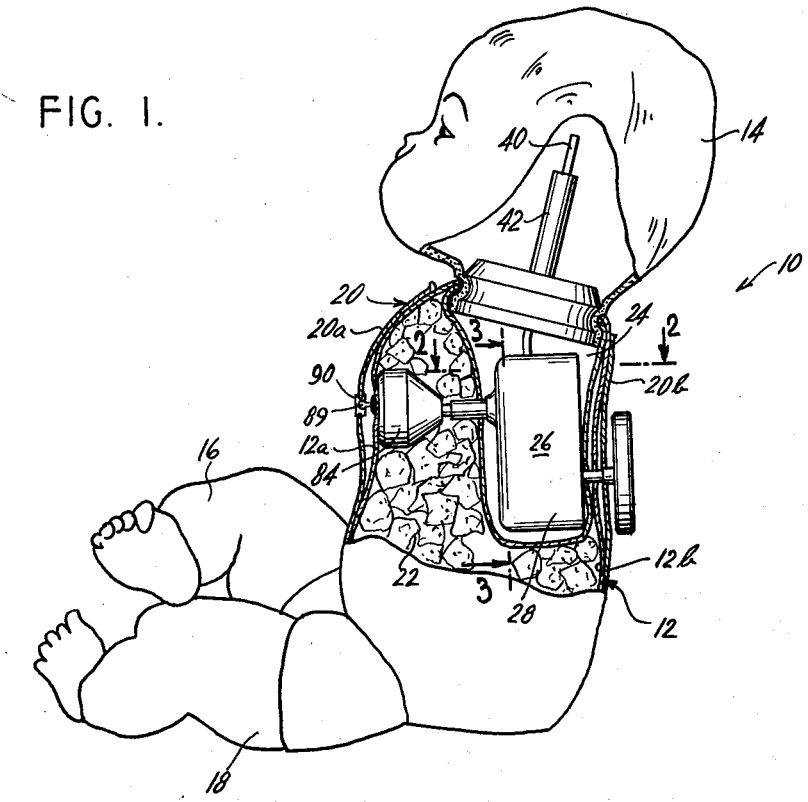
FIG. 1.
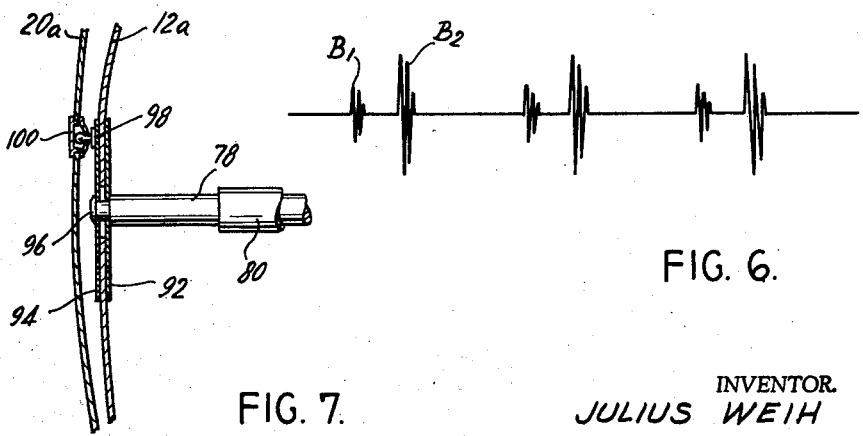
FIG. 6.
FIG. 7.
INVENTOR.
JULIUS WEIH
BY Amster & Levy
ATTORNEYS May 25, 1965          J. WEIH          3,184,886
DOLL INCLUDING A COMBINED SOUND AND MOTION PRODUCING MECHANISM
Filed Feb. 26, 1962          2 Sheets-Sheet 2
FIG. 2.
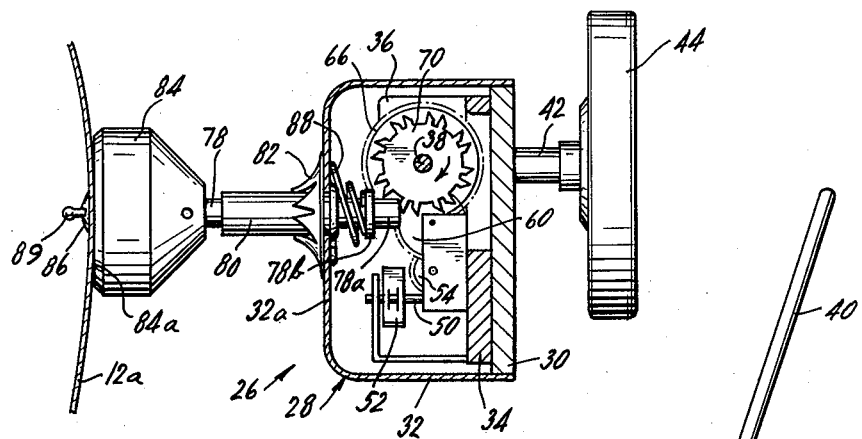
FIG. 4.
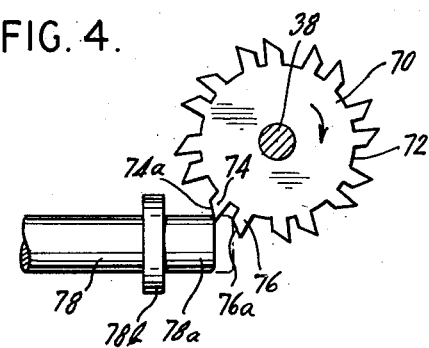
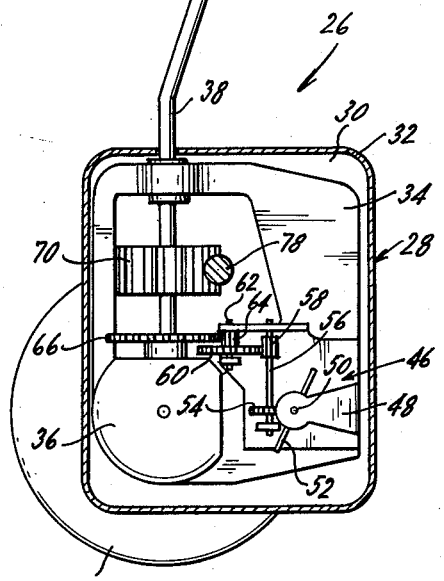
FIG. 3.
FIG. 5.
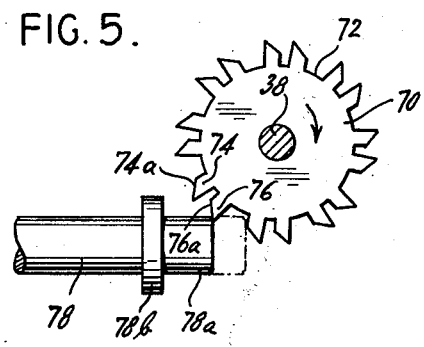
INVENTOR.
JULIUS WEIH
BY Amster + Levy
ATTORNEYS United States Patent Office 3,184,886
Patented May 25, 1965

3,184,886
DOLL INCLUDING A COMBINED SOUND AND MOTION PRODUCING MECHANISM
Julius Weib, Ozone Park, N.Y., assignor to Ideal Toy Corporation, Hollis, N.Y., a corporation of New York
Filed Feb. 26, 1962, Ser. No. 175,465
7 Claims. (Cl. 46—118)

The present invention relates generally to children's toys, dolls, stuffed animals and the like, and in particular to a combined sound and motion producing mechanism which is adapted to be incorporated into a doll or similar figure toy and is operable to provide recurring audible sounds simulating a human heartbeat and palpitations of the chest portion of the figure in timed relation to such heartbeats.

Various mechanical, electrical and electro-mechanical devices have been suggested for incorporation into dolls or similar figure toys to enhance the life-like characteristics thereof by emitting sounds which simulate that of the human heart. The commercial acceptance of these devices has been rather limited, due in part to their comparatively high cost, inherent complexity, inability to withstand the relative rough handling incident to normal use, and limited play value. There exists a need for a rugged mechanical heartbeat mechanism which is relatively simple in construction, yet produces, preferably on an amplified scale, a sound simulating that of the human heartbeat. The play value of such heartbeat mechanism would be greatly enhanced by accompanying the heartbeat with motion of the chest region of the doll such that the doll would palpitate or throb concurrent with the emission of the heartbeat sound.

Broadly it is an object of the present invention to provide an improved motion producing and sound emitting device which exhibits one or more of the aforesaid advantages. Specifically, it is within the contemplation of the present invention to provide a combined sound and motion producing mechanism which is adapted to be mounted in a doll body and produces recurring sounds simulating a heartbeat and substantially synchronized palpitations of the chest region of the doll.

In accordance with an illustrative embodiment demonstrating objects and features of the present invention, there is provided a doll including a body having a chest region or portion, a sound-producing means within the body for providing an audible sound simulating that of the human heartbeat, and motion producing means likewise arranged within the body and effective to expand and contract the chest portion or region in time relation to the audible sound. Advantageously, the respective sound and motion producing means are part of the same mechanism and include a rotatable sounding member having a discontinued outer periphery. A clapper member engages the outer periphery of the sounding member and is reciprocated in response to rotation of the sounding member. A spring biases the clapper member into engagement with the outer periphery of the sounding member and the clapper member in turn is operatively connected to the chest portion of the doll body. The clapper member cooperates with the sounding member to produce recurring sounds as the clapper member is moved away from and returned into contact with the sounding member. The reciprocation of the clapper member concurrently causes palpitations or throbbing of the chest portion of the doll. Thus, there are provided audible sounds which simulate the human heartbeat and accompanying visible throbs or beats of the chest portion of the doll. The combined sound and animation imparts an exceptionally life-like characteristic to the doll or other figure toy.

The above brief description, as well as further objects, features and advantages of the present invention will be more fully appreciated by reference to the following detailed description of presently preferred, but nonetheless illustrative embodiments in accordance with the present invention, when taken in conjunction with the accompanying drawings, wherein:

FIG. 1 is an elevational view, with parts broken away and sectioned, showing an animated doll embodying a combined sound and motion producing mechanism in accordance with the present invention;

FIG. 2 is a sectional view, on an enlarged scale and taken substantially along the line 2—2 of FIG. 1, showing details of the combined sound and motion producing mechanism;

FIG. 3 is a sectional view, on an enlarged scale and taken substantially along the line 3—3 in FIG. 1, showing further details of the combined sound and motion producing mechanism;

FIG. 4 is a fragmentary elevational view showing the rotating sounding member and spring biased clapper member of the combined sound and motion producing mechanism, with the full lines showing the clapper member in its retracted position prior to unloading, and with the dotted lines showing the clapper member in its advanced position after having unloaded and produce the first beat of the characteristic heartbeat pair;

FIG. 5 is a view similar to FIG. 4, but showing the clapper member in its retracted position just prior to emitting the second beat of the characteristic heartbeat pair, the unloaded position of the clapper member being shown by the dot-dash lines;

FIG. 6 is a diagrammatic representation of the companion pairs making up heartbeats during successive sound-producing intervals; and, FIG. 7 is a fragmentary elevation and sectional view showing a modification for the attachment of the clapper member or plunger to the flexible chest wall of the doll body and the releasable securement of the chest wall to the outer garment of the doll.

Referring now specifically to the drawings, there is shown in FIG. 1 a doll 10 which includes a doll body 12, a head 14 movably mounted on the doll body for a relatively complex motion including components of rotation and flexion, a pair of arms (not shown) which are hingedly connected to the body 12, and a pair of legs 16, 18 which are of identical construction and hingedly connected to the doll body 12. The doll body 12 includes a flexible front or chest wall 12a and a spaced rear wall 12b. Overlying the front and rear walls are the respective front and rear walls or panels 20a, 20b of an outer garment 20 for the upper torso portion of the doll, such as a blouse, sweater, jacket, dress or the like. The doll is stuffed, as indicated at 22, and is provided with an internal cavity or chamber 24 which receives a concealed motion producing and sound producing mechanism, generally designated by the reference numeral 26. The details of the doll construction and certain aspects of the sound and motion producing mechanism 26 are more fully described in copending application Serial No. 120,144 filed June 23, 1961, now Patent No. 3,029,552, in the name of Abraham M. Katz and entitled ANIMATED DOLL, which application is assigned to the assignee of the present application.

The sound and motion producing mechanism 26 includes a housing 28 having a base plate 30 and removable cover 32. Secured to the base plate 30 is a casting 34 which has mounted thereon a conventional spring motor 36 having an output or actuating shaft 38 which terminates in an angularly offset shaft extension 40. As seen in FIG. 1, the angularly offset shaft extension 40 is coupled to a sleeve 42 in the head 14 of the doll and is effective to impart rotation and flexion to the head in response to rotation of the shaft 38, as more fully described in said copending application.

Provision is made for winding up the spring motor 36, as for example, by a winding shaft 42 which extends through the superposed back or rear walls 12b, 20b and carries an external winding knob 44.

Means are provided for governing the rate of rotation of the output or actuating shaft 38, as is generally understood. In this illustrative embodiment, a vane-type governor 46 is geared to the output shaft 38 to establish a relatively constant rate of rotation for the output shaft 38 substantially independent of the load imparted thereto. Specifically, the vane-type governor 46 includes a mounting bracket 48 which journals an upstanding governor shaft 50 having a vane 52 mounted thereon. The lower end of the governor shaft 50 is formed with a worm (not shown) which is engaged by a gear 54 carried by an idler shaft 56. The idler shaft 56 in turn carries a pinion 58 which is coupled to an intermediate gear 60 on a further idler shaft 62 which carries a pinion 64. The pinion 64 in turn meshes with a relatively large diameter gear 66 connected to the output shaft 38 of the spring motor 36. As is generally understood, the gearing ratio of the train of gears 66, 64, 60, 58 and 54 intermediate the output shaft 38 and the main type governor 46 is selected to establish the desired rate of rotation for the output shaft 38. Although the invention will be described in this specific environment, it will be appreciated that the instant sound and motion producing mechanism will find useful applications in other types of devices, and, with a variety of drives, either of the mechanical or electrical types.

In accordance with the present invention, a combined sounding and actuating member, gear or cam 70 is mounted on the output shaft 38 of the spring motor 36, with the output shaft serving as a drive means for rotating the member, cam or gear 70 about an axis coincident with the axis of the output shaft 38. Projecting substantially radially from the outer periphery or rim 72 of the combined sounding and actuating member 70 are plural pairs of teeth, one such pair being designated by the reference numerals 74, 76. The plural pairs of teeth, 74, 76 are provided with inclined contact or cam faces, such as designated by the reference characters 74a, 76a.

Extending substantially at right angle to the longitudinal axis of the doll body 12 and the output shaft 38, is a clapper member or plunger 78 which is mounted on the removable cover 32 of the housing 28 for axial reciprocation. Specifically, the clapper member or plunger 78 is slidable within a mounting sleeve 80 which projects from the front wall 32a of the cover 32 and is secured thereto in any appropriate fashion, as by the serrated mounting ring 82. The inner terminal portion or end 78a of the clapper member or plunger 78 is arranged to ride upwardly along the successively presented camming surfaces provided by the contact faces 74a, 76a of successive pairs of teeth 74, 76 and by successive segments of the outer periphery or rim 72 of the cam 70. The outer terminal portion or end 78a of the clapper member or plunger 78 terminates at a location spaced from the front or chest wall 12a of the doll body 12 (see FIG. 1) and carries an enlarged plunger head 84. The plunger head 84 terminates in an outer face 84a which underlies the flexible front or chest wall 12a of the doll body 12 and is secured thereto in any appropriate fashion, as by the bolt 86.

A coil spring 88 encircles the plunger 78 intermediate the top wall 32a of the cover 32 and a shoulder or collar 78b on the plunger 78 and normally biases the terminal portion or end 78a of the plunger 78 into contact with the outer periphery 72 and teeth 74, 76 of the cam 70. As the plunger 78 is urged outwardly and away from the axis of the actuating shaft 38 by the inclined camming surfaces on contact faces 74a, 76a of the teeth 76, the coil spring 88 will be placed into compression; and as the terminal portion 78a of the plunger 78 clears the outermost ends or tips of successive contact faces 74a, 76a, the plunger 78 will be driven inwardly and toward the axis of the cam 70 under the influence of the coil spring 88 to contact the next surface presented (i.e. the camming surface 76a or the segment of the outer periphery 72 intermediate the trailing tooth 76 of a pair and the leading tooth 74a of the next pair).

Both the actuating and sounding member 70 and the clapper member 78 are fabricated of a metallic material which will give off a sound as the clapper member 78 is driven into contact with successive portions of the actuating and sounding member 70. Specifically, and as may be best appreciated by progressively inspecting the full and dotted line showings in FIGS. 4 and 5, as the actuating and sounding member rotates in the clockwise direction, the clapper member 78 will be first urged outwardly by the camming surface 74a until such time as the terminal portion 78a clears from the tip or point of the camming surface 74a whereupon the spring 88 will drive the clapper member 78 forward and into the dotted line position shown in FIG. 4. Contact of the clapper member 78 with the camming surface 76a of the tooth 76 will emit a first sound or beat which is intended to simulate the first beat of the characteristic pair associated with the human heartbeat. Continued rotation of the actuating and sounding member 70 in the clockwise direction will once again cause the clapper member 78 to be urged outwardly and load the coil spring 88, with the clapper member moving into the loaded position shown in FIG. 5. As the terminal portion 78a of the clapper member 78 again clears the point or tip of the camming surface 76a, the clapper member 78 once again will be driven forwardly into the dotted line position shown in FIG. 5, and depending upon the design of the cam 70 and the arrangement of the teeth 74, 76, will either contact the outer periphery or rim 72 or the adjacent face of the tooth 74 of the next pair. In successive sound-producing intervals, as determined by spacing between successive pairs of teeth 74, 76, there will be emitted a dit-dah sound which will impart a relatively life-like characteristic to the animated figure, particularly when it is appreciated that such heartbeat will be accompanied by a corresponding throbbing or pulsing of the chest wall 12a of the doll body 12. The repetition rate of the individual beats and of successive pairs of beats of the heartbeat will of course be determined by the spacing of the teeth with respect to each other and between successive pairs. Further, the intensity of the beats will be determined by the profile and radial extension of the teeth. By proper selection of these design parameters, as well as the materials employed in fabricating the coacting sound producing members 70, 78, the desired sound effects may be incorporated into the doll.

In some instances, the clothing of the doll 10 which overlies the doll body 12, and in particular the front or chest wall 12a thereof, is loosely fitted such that the throbbing, palpitating or pulsating of the chest in the region of the heartbeat mechanism is masked or obscured by such loose fitting clothing or outer garments. To avoid this, the invention contemplates the provision of releasable attaching means for connecting the chest wall 12a to the overlying wall 20a of the outer garment 20 such that the outer garment will follow the movements of the chest wall. As seen in FIG. 1, this may be achieved by incorporating a separable fastener 89, 90 between the walls 12a, 20a. In the illustrative embodiment, the male element 89 of the separable fastener is secured to the flexible chest wall 12a substantially coaxially of the plunger 78 and the female element 90 of the separable fastener is secured to the overlying garment wall 20a in position to be engaged with the male element 89. The presence of the female element 90 may be hidden from view by appropriate external ornamentation or the like on the garment 20. Upon engagement of the separable fastener elements 89, 90, the outer garment 20 in the region overlying the heartbeat mechanism will be drawn close to the plunger head 84 and thereby follow the movements thereof.

In the modification illustrated in FIG. 7, the plunger proper 78 is extended to the front or chest wall 12a of the doll body and is secured thereto by superposed securement plates or discs 92, 94 and a centrally disposed attachment bolt 96. In turn, the flexible chest wall 12a is connected to the adjacent wall 20a of the outer garment by the provision of the male separable fastener 98 which is secured to the outer plate or disc 94 at a location laterally offset from the plunger 78, with the female element 100 of the separable fastener being secured to the superposed portion of the garment wall 20a in position to be releasably secured to the male separable fastener element 98. By this arrangement, the flexible outer wall 12a of the doll body 12 will be caused to reciprocate or pulsate in response to movement of the plunger 78 and a corresponding movement will be imparted to the adjacent portions of the outer garment 20.

In order to facilitate a more thorough understanding of the present invention, a typical sequence of operations will now be described:

To place the device into operation, the user merely winds up the spring motor 36 by grasping the external winding knob 44 and turning the same. Upon release of the winding knob 44, the spring motor 36 will revolve the actuating or output shaft 38 at a substantially uniform rate established by the governor 46 and the gearing interconnected between the governor 46 and the output shaft 38. In this illustrative embodiment, the drive is arranged to rotate the combined actuating and sounding member 70 in the clockwise direction, as viewed in FIGS. 2, 4, and 5. Assuming that the free end or terminal portion 78a of the clapper member or plunger 78 is riding up on the camming surface 74a of the tooth 74, rotation of the sounding and actuating member 70 will first cause the terminal portion 78a to fall from the camming surface 74a and contact the camming surface 76a, as may be appreciated by comparing the full and broken line showings in FIG. 4. This will produce a relatively soft audible beat $B_1$ (see FIG. 6), the magnitude and character of which can be controlled by the dimensioning of the tooth 74, the selection of material, and the like. Continued rotation of the sounding and actuating member 70 will cause the leading end or terminal portion 78a of the plunger to drop from the tooth 76a into the dwell portion between successive pairs of teeth. As the terminal portion 78a contacts the dwell portion and/or the next adjacent tooth 76a, there will be emitted a relatively loud second beat $B_2$ (see FIG. 6) which will follow the beat $B_1$ by a delay determined by the circumferential spacing of the teeth 74, 76. Continued rotation of the sounding and actuating member will cause the next pair of beats to occur, with the interval between successive pairs of beats being determined by this spacing between successive pairs of teeth 74, 76. Successive reciprocations of the plunger 78 of course will bring about corresponding palpitations or pulsations of the chest wall 12a and the overlying portion 20a of the outer garment 20 of the doll 10.

A latitude of modification, change, and substitution is intended in the foregoing disclosure and in some instances some features of the invention will be employed without a corresponding use of other features. Accordingly, it is appropriate that the appended claims be construed broadly and in a manner consistent with the spirit and scope of the invention herein.

What I claim is:

1. The combination with a doll including a body having a chest portion, of combined sound and motion producing mechanisms within said body arranged to produce recurring sounds simulating a heartbeat and substantially synchronized recurring palpitations of said chest portion, said mechanisms comprising a rotatable sounding member including a discontinuous outer periphery, actuating means operatively connected to said sounding member for rotating said sounding member, a reciprocable clapper member engaging said outer periphery of said sounding member and reciprocated in response to rotation of said sounding member, a spring biasing said clapper member into engagement with said outer periphery of said sounding member, and means operatively connecting said clapper member to said chest portion of said body, said clapper member cooperating with said sounding member to produce recurring sounds as the clapper member is moved away from said sounding member by the outer periphery thereof and returned into contact with said sounding member under the influence of said spring, the reciprocation of said clapper member concurrently causing palpitations of said chest portion.

2. The combination with a doll including a body having a chest portion, of combined sound and motion producing mechanisms within said body arranged to produce recurring sounds simulating a heartbeat and substantially synchronized recurring palpitations of said chest portion, said mechanisms comprising a rotatable sounding member including an outer periphery having plural pairs of teeth thereon, actuating means operatively connected to said sounding member for rotating said sounding member, a reciprocable clapper member successively engaging said pairs of teeth on said outer periphery of said sounding member and reciprocated in response to rotation of said sounding member, a spring biasing said clapper member into engagement with said pairs of teeth on said outer periphery of said sounding member, and means operatively connecting said clapper member to said chest portion of said body, said clapper member cooperating with said sounding member to produce recurring sounds as the clapper member is moved away from said sounding member by said pairs of teeth and returned into contact with said sounding member under the influence of said spring, the reciprocation of said clapper member concurrently causing palpitations of said chest portion.

3. A doll including a stuffed body having a flexible chest wall, a combined sound and motion producing mechanism mounted within said body behind said chest wall and arranged to produce recurring sounds simulating a heartbeat and to further produce recurring movements of said chest wall, said mechanisms including a cam having plural teeth thereon, means operatively connected to and mounting said cam for rotating about an axis extending longitudinally of said body, a drive for rotating said cam, a plunger extending substantially at right angles to said axis and including a terminal portion in engagement with said teeth on said cam, means operatively connected to and mounting said plunger for reciprocating movement, a spring operatively connected to said plunger for urging the terminal portion thereof against said teeth on said cam, said teeth on said cam being contoured and arranged to move said plunger away from said axis twice in successive sound-producing intervals to produce two beats in rapid succession as said plunger strikes said cam which two beats simulate a heartbeat, and means connecting said plunger to said chest wall to impart movement thereto in response to reciprocation of said plunger.

4. A doll including a stuffed body having a flexible chest wall and an outer garment overlying said chest wall, a motion producing mechanism mounted within said body behind said chest wall and arranged to produce sounds simulating a heartbeat and to further produce recurring movements of said chest wall, said mechanisms including a cam having plural teeth thereon, means operatively connected to and mounting said cam for rotating about an axis extending longitudinally of said body, a drive for rotating said cam, a plunger extending substantially at right angles to said axis and including a terminal portion in engagement with said teeth in said cam, means operatively connected to and mounting said plunger for reciprocating movement, a spring operatively connected to said plunger for urging the terminal portion thereof against said teeth on said cam, means connecting said plunger to said chest wall to impart movement thereto in response to reciprocation of said plunger, and releasably attaching means for connecting said chest wall to said outer garment such that said outer garment will follow the movements of said chest wall.

5. A doll according to claim 4 wherein said releasably attaching means includes male and female separate fastener elements secured to said chest wall and said outer garment.

6. A doll including a stuffed body having a flexible chest wall motion producing mechanism mounted within said body behind said chest wall and arranged to produce recurring movements of said chest wall, said mechanism including a cam having plural teeth thereon, means operatively connected to and mounting said cam for rotating about an axis extending longitudinally of said body, a drive for rotating said cam, a plunger extending substantially at right angles to said axis and including a terminal portion in engagement with said teeth in said cam, means operatively connected to and mounting said plunger for reciprocating movement, a spring operatively connected to said plunger for urging the terminal portion thereof against said teeth on said cam, and means connecting said plunger to said chest wall to impart movement thereto in response to reciprocation of said plunger.

7. A doll including a stuffed body having a flexible chest wall and an outer garment overlying said chest wall, a combined sound and motion producing mechanism mounted within said body behind said chest wall and arranged to produce recurring sounds simulating a heartbeat and to further produce recurring movements of said chest wall, said mechanism including a cam having plural teeth thereon, means operatively connected to and mounting said cam for rotating about an axis extending longitudinally of said body, a drive including a winding knob external to and at the back of said body for rotating said cam, a plunger extending substantially at right angles to said axis and including a terminal portion in engagement with said teeth on said cam, means operatively connected to and mounting said plunger for reciprocating movement, a spring operatively connected to said plunger for urging the terminal portion thereof against said teeth on said cam, said teeth on said cam being contoured and arranged to move said plunger away from said axis twice in successive sound-producing intervals to produce two beats in rapid succession as said plunger strikes said cam which two beats simulate a heartbeat, means connecting said plunger to said chest wall to impart movement thereto in response to reciprocation of said plunger, and releasably attaching means for connecting said chest wall to said outer garment such that said outer garment will follow the movements of said chest wall.

References Cited by the Examiner

UNITED STATES PATENTS

| | | | |
|---|---|---|---|
| 209,249 | 10/78 | Gibbs | 74—55 |
| 801,876 | 10/05 | Holmes | 46—192 |
| 2,154,121 | 4/39 | Bold | 46—141 |
| 2,395,179 | 2/46 | Genjack | 46—192 |
| 2,620,594 | 12/52 | Parisi | 46—118 |
| 2,859,731 | 11/58 | Sutton | 46—192 |
| 2,887,818 | 5/59 | Zalkind | 46—189 |
| 3,014,312 | 12/61 | Convertine | 46—118 |

FOREIGN PATENTS 79,512  2/19  Switzerland.

RICHARD C. PINKHAM, *Primary Examiner.*

DELBERT B. LOWE, *Examiner.*